United States Patent [19]
Klyce et al.

[11] Patent Number: 5,295,895
[45] Date of Patent: Mar. 22, 1994

[54] METHOD AND APPARATUS FOR SKINNING ENCASED FRANKFURTERS AND THE LIKE

[76] Inventors: Thomas A. Klyce, 4436 Ferndale, Memphis, Tenn. 38122; Jerry W. Davis, 4115 Sunny Meadows, Bartlett, Tenn. 38135

[21] Appl. No.: 79,408
[22] Filed: Jun. 21, 1993
[51] Int. Cl.⁵ ............................................. A22C 11/00
[52] U.S. Cl. ........................................................ 452/50
[58] Field of Search .................................. 452/50, 51

[56] References Cited

U.S. PATENT DOCUMENTS

| | | | |
|---|---|---|---|
| 2,369,360 | 2/1945 | Martin | 452/50 |
| 2,730,754 | 1/1956 | Schneider | 452/50 |
| 2,757,410 | 8/1956 | Cline | 452/50 |
| 2,954,579 | 10/1960 | Menghini | 452/50 |
| 3,055,045 | 9/1962 | Brendle et al. | 452/50 |
| 3,312,995 | 4/1967 | Garey | 452/50 |
| 3,390,422 | 7/1968 | Doyle | 452/50 |
| 3,487,499 | 1/1970 | Klyce | 452/50 |
| 3,568,242 | 3/1971 | Moore | 452/50 |
| 3,570,044 | 3/1971 | Gartrell | 452/50 |
| 3,895,414 | 7/1975 | Klyce | 452/50 |
| 4,414,707 | 11/1983 | Koken | 452/50 |

FOREIGN PATENT DOCUMENTS

303966 2/1989 European Pat. Off. ............. 452/50

*Primary Examiner*—Willis Little
*Attorney, Agent, or Firm*—Walker, McKenzie & Walker

[57] ABSTRACT

Apparatus for skinning the casing from a chain of encased frankfurters. The apparatus has a plurality of carrier wheels which conveys the frankfurter chain in a sinuous path to provide at least a pair of stressing stations where the casing is stressed first on one side and then the other. Knives are located at the stressing stations which slit the casing on opposite sides thereof.

13 Claims, 2 Drawing Sheets

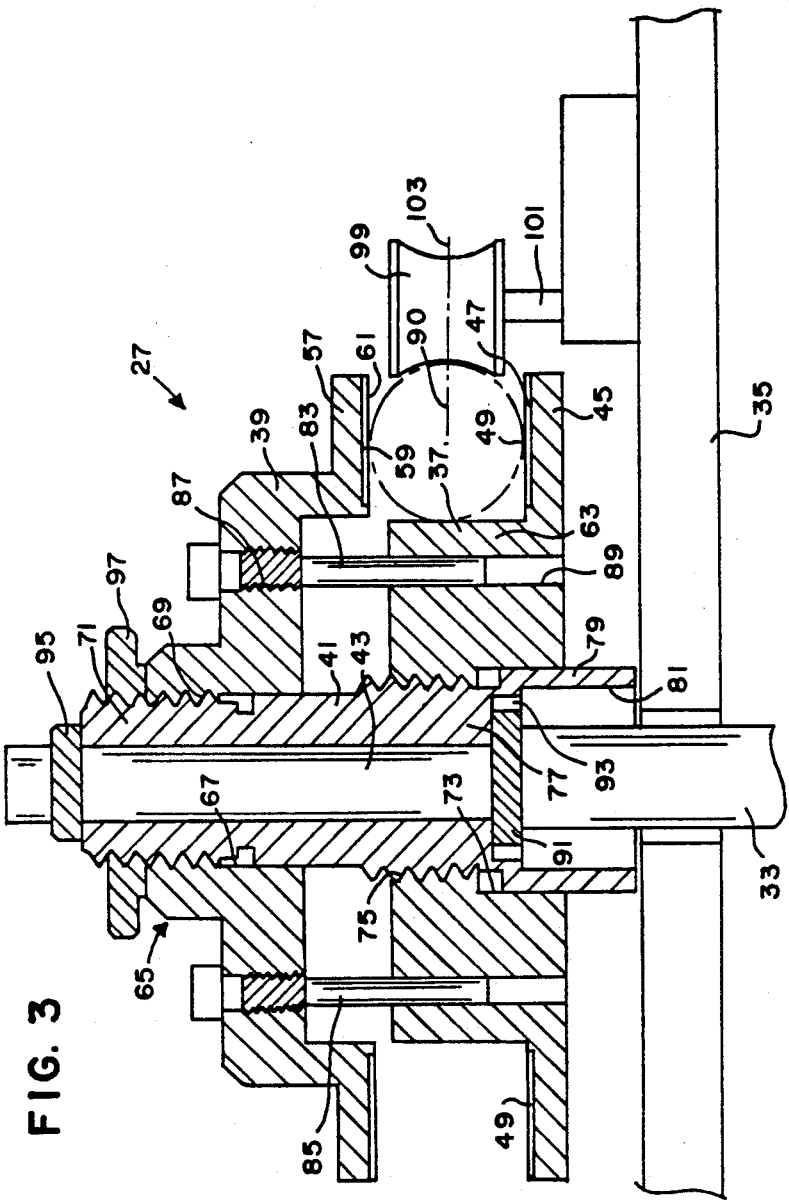

METHOD AND APPARATUS FOR SKINNING ENCASED FRANKFURTERS AND THE LIKE

BACKGROUND OF THE INVENTION

1. Field of the Invention

The present invention relates, in general, to a method and apparatus for skinning the casing from encased frankfurters and the like.

2. Information Disclosure Statement

Frankfurters are typically manufactured by placing the desired ingredients in an elongated plastic tube or the like (often referred to as the "skin" of the frankfurter). The encased strand or chain of frankfurters is then processed or cooked and the plastic tube or skin is then removed from the processed frankfurter prior to packaging. Frankfurter skinners or peelers have been provided for conditioning and removing the skin from processed frankfurters. Such frankfurter peelers or skinners are well known to those skilled in the art and typically include a steam conditioning unit for applying steam to the frankfurters before the skin or casing is slit, and subsequently compressed air and/or a vacuum unit is utilized for removing the skin. A typical apparatus for skinning a chain of sausages and the is like shown in Garey, U.S. Pat. No. 3,312,995, issued Apr. 11, 1967.

One problem common to many such frankfurter peelers is that difficulty has been encountered at the twist points (i.e. the twisted portions between the kernels which attach the ends of the frankfurters one to another) in slitting the round end of the frankfurter casing deeply enough toward the twist so that harder to peel products may cause a problem. Another problem is that by the time the chain of frankfurters reach the vacuum unit the casings are not sufficiently loose from the kernels so that the casing will not separate readily from the kernels when the vacuum is applied to the casings.

A preliminary patentability search in class 452, subclass 50, produced the following patents which may relate to the present invention; Martin, U.S. Pat. No. 2,369,360, issued Feb. 13, 1945; Menghini, U.S. Pat. No. 2,954,579, issued Oct. 4, 1960; Brendle et al., U.S. Pat. No. 3,055,045, issued Sep. 25, 1962; and Klyce, U.S. Pat. No. 3,487,499, issued Jan. 6, 1970.

Martin discloses a sausage skinning machine which has a rotary cutter along a straight path of the chain of sausages at the bottom thereof. Also, the machine has a pair of knives that are mounted in spaced relationship on the periphery of a roller and which knives cut the tie string (twisted portion between the kernels). In addition, the machine has a separate knife which cuts the skin or casing at the top of the sausage chain. Thus, separate operations are provided, one for cutting the twisted portions and the other for cutting the skin or casing.

Menghini discloses a frankfurter skinning apparatus which includes an intermediate disk member and a pair of outer disk members that are rotatably mounted and over which the chain of frankfurters pass. A knife is provided adjacent the intermediate one of the disks which slits the casings of the frankfurters.

Brendle et al. discloses an apparatus in which the sausage is cut by bending the sausage into a curve and then drawing the outside, i.e., that portion having the longer radius, of the curved sausage along the cutting edge of a sharp cutting instrument. In one embodiment the sausage is not only flexed longitudinally, but the casing is pulled circumferentially away from the knife at the area of cutting to facilitate the cutting and assist in loosening the casing from the sausage.

Klyce discloses an apparatus for peeling a chain of sausages. The apparatus includes a substantially large-diametered power-driven wheel having a grooveway around the rim of the wheel. The apparatus includes means for guidingly constraining the chain of sausages in the grooveway of the wheel and for moving the sausage chain in an arced path around substantially a quarter sector of the wheel. The apparatus includes a plurality of successionally arranged means for acting on the sausages as they move along the curved path including oven means for heating the moving sausages, knife means for slitting the sausage casing of each sausage link, compressed air means for loosening the casing from the sausage meat kernel, and vacuum air means for remotely separating the string of meat-free casings from the meat kernels of the sausage chain.

While each of the above patents disclose various apparatuses for skinning frankfurters and the like, none disclose the apparatus and method of the present invention. More specifically, none of the references disclose apparatus for skinning the casing from a chain of encased frankfurters and the like comprising conveying means for loosening the casing of the frankfurters and at the same time conveying the frankfurters endwise in a moving chain of frankfurters along a sinuous path and for applying tension to the chain of frankfurters to provide at least a pair of stressing stations at which the chain of frankfurters is bent and the casing thereof is stressed at least along one side, and knife means provided at least at one of said stressing stations for slitting the stressed side of the casing of the chain of frankfurters as the chain moves by said one of said stressing stations.

SUMMARY OF THE INVENTION

The present invention is directed toward providing an improved method and apparatus for skinning encased frankfurters and the like. The concept of the present invention is to provide a conveying means for loosening the casing of the frankfurters and at the same time conveying the frankfurters endwise in a moving chain of frankfurters along a sinuous path and for applying tension to the chain of frankfurters to provide at least a pair of stressing stations at which the chain of frankfurters is bent and the casing is stressed at least along one side, and to provide knife means at least at one of the stressing station for slitting the stressed side of the casing of the chain of frankfurters as the chain moves by said one of the stressing stations.

One of the objects of the present invention is to provide an apparatus for skinning the casing from a chain of encased frankfurters which improves the separability of the casing from the kernel.

A further object is to provide improved means for slitting the casing closer to the twist points between the links of frankfurters.

A further object is to provide such a frankfurter skinning apparatus wherein the apparatus will accommodate various frankfurter chains having different diameters.

A further object is to provide such an apparatus which has the potential of reducing the quantity of air and steam required to manufacture frankfurters and the like.

A BRIEF DESCRIPTION OF THE DRAWINGS

FIG. 3 is an enlarged sectional view of a portion of that shown in FIG. 2.

FIG. 4 is a somewhat diagramatic view of a pair of links of a frankfurter chain which is processed by a typical straight line path frankfurter skinning apparatus.

FIG. 5 is a somewhat diagramatic view showing the configuration of a portion of two links of a frankfurter chain as it is being processed by the apparatus of the present invention.

FIG. 6 is a sectional view taken as on the line 6—6 of FIG. 2.

DESCRIPTION OF THE PREFERRED EMBODIMENT

Figure 1:
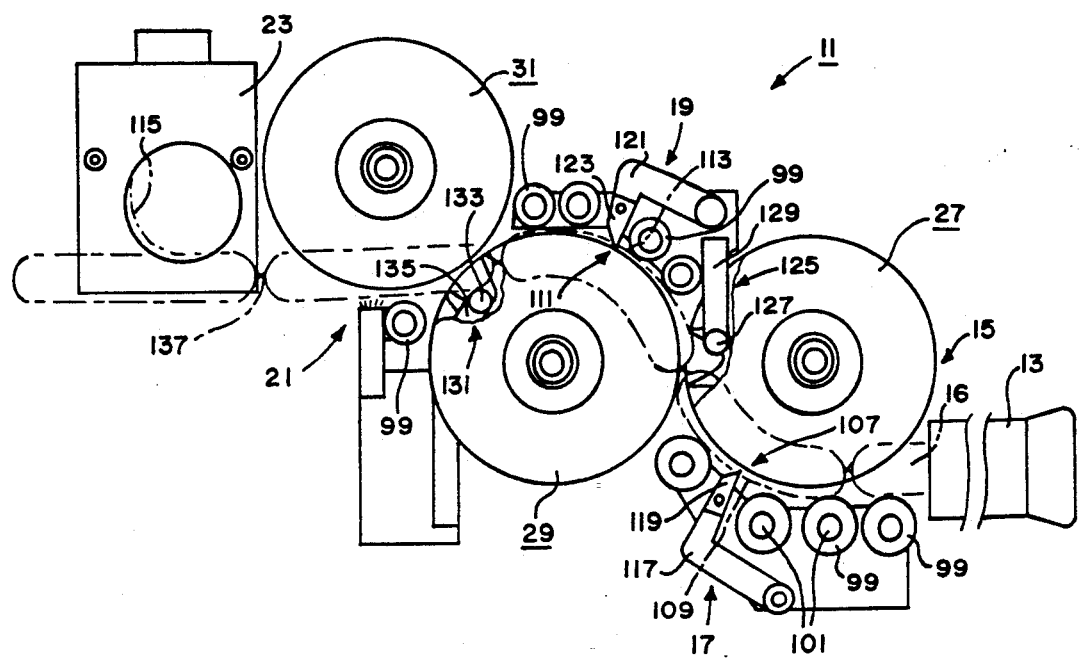
FIG. 1 is a top plan view of the apparatus of the present invention.

The apparatus 11 of the present invention includes in general a steam unit 13 of known construction, for example like that shown in Garey, U.S. Pat. No. 3,312,995 (hereinafter the '995 patent); conveying means 15 for loosening the casing from an encased meat product, as for example, frankfurter chain 16 and at the same time conveying the frankfurter chain endwise in a moving chain of frankfurters along a sinuous path, best seen in FIG. 1; preferably a pair of casings slitter means, namely first slitter means 17 and second slitter means 19; air means 21; and vacuum means 23. The vacuum means 23 is of any suitable well known type, as for example like that shown in the '995 patent and includes perforations 25 through which air is drawn in by air suction means, not shown, as for example like that shown in the '995 patent.

Conveying means 15 preferably includes carrier wheels, namely a first carrier wheel 27, a second carrier wheel 29 and a third carrier wheel 31, although more or less than three carrier wheels may be provided without departing from the spirit and scope of the present invention. The carrier wheels 27, 29 and 31 are preferably substantially identical and the following description of first carrier wheel 27 will suffice for all.

First carrier wheel 27 includes an axle 33 rotatably mounted from the base 35 of apparatus 11, by any suitable well known means, a lower carrier wheel half 37, an upper carrier wheel half 39, and an adjustment sleeve 41 which is slidably mounted on the reduced upper end portion 43 of axle 33. Lower carrier wheel half 37 includes a lower flange 45 having an upper surface 47 which is provided with a plurality of teeth 49 around the circumference of lower carrier wheel half 37 as best shown in FIG. 6 wherein it will be seen that the base 51 of each of the teeth is relatively broad on the inner portion thereof and tapers substantially to a point 53 at the outer end thereof. The teeth 49 are preferably formed by milling out the portions 55 of the upper surface 47 to a depth of approximately 0.03 inches (0.762 mm) so that the unmilled portions of the surface 47 establish the teeth 49 and so that the teeth are preferably flat along the upper surfaces thereof and extend upwardly approximately 0.03 inches (0.762 mm) above the milled portions 55. Upper carrier wheel half 39 includes an upper flange 57 having a lower surface 59. Lower surface 59 preferably has teeth 61 which are preferably identical in number and shape to teeth 49. Teeth 61 also are preferably positioned above and in alignment with teeth 49. Also, the flanges 57, 45 are preferably in vertical alignment with one another. In addition, teeth 61 are preferably formed in the same manner as teeth 49 and of the same depth, i.e. 0.030 inches 0.762 mm).

Lower carrier wheel half 37 includes a cylindrical mid-portion 63 from which lower flange 45 extends for engaging the chain of frankfurters on the side thereof, as best seen in FIG. 3. Thus, it will be seen from this FIG. that there is a three point contact of carrier wheel 27 with the frankfurter chain 16 namely at mid-portion 63, teeth 49 and teeth 61 so that with the frictional engagement by teeth 49, 61 and mid-portion 63, the chain 16 of frankfurters are held securely.

Conveying means 15 also includes mounting means 65 interacting between axle 33, lower carrier wheel half 37 and upper carrier wheel half 39. Mounting means 65 is preferably constructed as follows: The upper part of a central opening 67 extending through upper carrier wheel half 39 is provided with right hand threads 69 which threadedly engage corresponding right hand threads on the upper portion 71 of adjustment sleeve 41. The upper part of a central opening 73 extending through lower carrier wheel half 37 is provided with left hand threads 75 which threadedly engage corresponding left hand threads on the lower portion 77 of adjustment sleeve 41. An enlarged extension 79 of adjustment sleeve 41 extends downwardly below lower portion 77 and is provided with an enlarged opening 81 for a purpose later to be described.

A pair of traveler pins 83, 85 coact between upper carrier wheel half 39 and lower carrier wheel half 37. Traveler pins 83, 85 are substantially identical and coact with the carrier wheel halves 39, 37 in the same manner. Thus, the following description of traveler pin 83 and its coaction with the carrier wheel halves 39, 37 will suffice for both.

Traveler pin 83 threadedly extends through a threaded portion 87 of a vertical bore provided through upper carrier wheel half 39. The smooth lower portion of pin 83 extends slidably into a smooth bore 89 provided in lower carrier wheel half 37. Traveler pins 83, 85 are preferably disposed on opposite sides of the carrier wheel halves 39, 37, as best seen in FIG. 3. From the foregoing it will be understood that the traveler pins 83, 85 when threaded into place in upper carrier wheel half 39 are locked to upper carrier wheel half 39 and slidably mounted relative to lower carrier wheel half 37 so that the lower carrier wheel half 37 is caused to turn together with the upper carrier wheel half 39. The right hand threads 69 of the upper carrier wheel half 39 and the left hand threads 75 of the lower carrier wheel half 37 cause the upper and lower carrier wheel halves 39, 37 to move apart when the carrier wheel 27 is turned in one direction relative to adjustment sleeve 41 and cause the upper and lower carrier wheel halves to move toward one another when the carrier wheel 27 is rotated in the opposite direction relative to the adjustment sleeve 41. It will be understood that the horizontal center line 90 between the upper flange 57 and the lower flange 45 will not move regardless of how much or in which direction the carrier wheel 27 is rotated relative to adjustment sleeve 41.

There is a drive pin 91 which extends through a transverse bore in axle 33, and is fixed relative thereto. The opposite ends of drive pin 91 extend outwardly from axle 33 into a transverse groove 93 in adjustment sleeve 41 so that when the drive pin 91 is in groove 93 as shown in FIG. 3, rotation of axle 33 will turn adjustment sleeve 41 therewith. A quick removable retainer pin 95 removably extends through a transverse bore in the upper end of axle 33 to prevent upward movement of adjustment sleeve 41 relative to axle 33 when the retainer pin is in place. A lock nut 97 is threadedly engaged on the threaded exterior of the upper portion of adjustment sleeve 41 to lock the upper and lower carrier wheel halves 39, 37 to adjustment sleeve 41. It will be understood that when retainer pin 95 is removed from axle 33 the assembly of the upper and lower carrier wheel halves 39, 37 and adjustment sleeve 41 with the associated parts may be removed as a unit from axle 33. It will be noted that drive pin 91 will not prevent the above mentioned removal of the assembly since transverse groove 93 is open at the bottom so that the adjustment sleeve 41 and drive pin 91 can move apart from one another. Also, it will be understood that when lock nut 97 is loosened the upper and lower carrier wheel halves 39, 37 may be adjusted relative to one another as heretofore described. It will be understood that this may be accomplished with the above mentioned assembly mounted on axle 33 and retainer pin 95 in place so that the adjustment may be made quickly and accurately.

Figure 2:
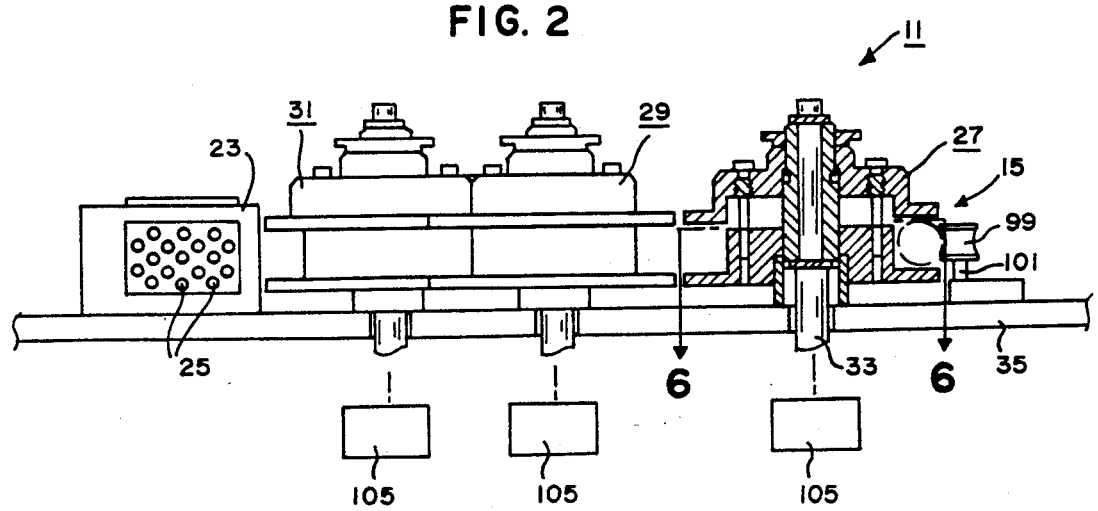
FIG. 2 is a partially sectionalized side elevational view of the apparatus of FIG. 1 showing portions somewhat schematically.

There are plurality of guiding means which are preferably in the form of rollers 99 that are rotatably mounted by suitable means from base 35 as by pins 101. The rollers 99 are preferably concave as best seen in FIGS. 2 and 3 with the center line 103 of each of the rollers being coincident with the heretofore mentioned center line 90 between flanges 45, 57 so that the adjustment to accommodate different sizes of frankfurters and the like may be made with the minimum amount of effort and with accuracy. It will be understood that the rollers 99 are in positions to aid in the guiding of the frankfurter chain 16 and will not interfere with the three point contact heretofore mentioned relative to the flanges 45, 57 and mid-portion 63.

The first, second and third carrier wheels 27, 29, 31 are preferably driven by suitable motor means 105 which are connected to the axle 33 by suitable means well known to those skilled in the art. The direction of the driving of axles is such that the frankfurter chain 16 is moved through the apparatus 11 from the right to the left as viewed in FIGS. 1 and 2 with the frankfurter chain being fed to carrier wheel 27 after leaving the steam unit 13. Thus, as viewed in FIG. 1, first carrier wheel 27 is rotated clockwise, second carrier wheel 29 is rotated counter clockwise, and third carrier wheel 31 is rotated clockwise. It will be seen in FIG. 1 that first carrier wheel 27 is downstream of the steam unit 13 and upstream of vacuum means 23 and that the frankfurter chain 16 is moved in a first curved direction to provide a first stressing station 107 at which the frankfurter chain is bent in one direction, i.e. towards the center of first carrier wheel 27 and the casing thereof is stressed along an outer or first side 109 thereof.

Second carrier wheel 29 is positioned downstream of first carrier wheel 27 and upstream of vacuum means 23 for moving the frankfurter chain 16 in a second curved direction which is a reverse curved direction from said first curved direction to provide a second stressing station 111 at which the frankfurter chain is bent in the opposite direction from the bend of the frankfurter chain at the first stressing station 107. Also, the casing thereof is stressed along a second side 113 which is on the other side of the frankfurter or 180° from the first side 109 of the frankfurter.

Third carrier wheel 31 is downstream of second carrier wheel 29 and upstream of vacuum means 23 for moving the frankfurter chain 16 from second carrier wheel 29 to vacuum means 23 for removal of the casing 115 of the frankfurters. First and second carrier wheels 27, 29 are preferably in line with one another and third carrier wheel 31 is off to one side as seen in FIG. 1.

First slitter means 17 is a suitable slitter means known to those skilled in the art, as for example like that shown in the '995 patent and preferably includes a knife holder 117 and a knife 119 for engaging the casing 115 of the frankfurter chain 16 at first stressing station 107 for slitting the first side 109 of the casing 115.

Second slitter means 19 is preferably identical in structure with first slitter means 17 and includes a knife holder 121 and a knife 123 for engaging the casing 115 to slit the second side 113 of the frankfurters.

Air means 21 is of any suitable construction, as for example like that shown in the '995 patent. The air means 21 is thus supplied with compressed air and is supported from base 35 by suitable means and positioned to discharge air onto the casing 115 of the frankfurter chain 16. It is preferably positioned opposite third carrier wheel 31 and before the chain of frankfurters reach the vacuum means 23, where the vacuum pulls the loosened and slit casing 115 from the meat kernel of the frankfurter chain 16.

A first finger means 125 is provided adjacent first carrier wheel 27 for engaging the frankfurter chain 16 downstream of the first stressing station 107 for ensuring release of the frankfurter chain 16 from first carrier wheel 27 so that the frankfurter chain 16 can continue to the second carrier wheel 29. First finger means 125 preferably comprises a roller 127 disposed in the space between upper and lower flanges 57, 45 of first carrier wheel 27. Roller 127 is rotatably mounted from base 35 by suitable means such as the arm 129. If desired, instead of a roller 127 a protrusion or rail fixed to arm 129 may be used in place of roller 127. A second finger means 131 is provided adjacent second carrier wheel 29 for engaging the frankfurter chain 16 downstream of second stressing station 111 for ensuring release of the frankfurter chain 16 from the second carrier wheel 29 so that the frankfurter chain can continue to the third carrier wheel 31. Second finger means 131 preferably comprises a roller 133 disposed in the space between the upper and lower flanges of carrier wheel 29. Roller 133 is supported by suitable means from base 35 as by means of an arm 135. As with first finger means 125, instead of roller 133 the second finger means 131 may comprise a protrusion or rail, if desired.

In the operation of the apparatus 11 of the present invention, the carrier wheels 27, 29, and 31 are adjusted in the manner previously described to accommodate the particular diameter size of the product being processed which in the example shown is a chain 16 of encased frankfurters. Then, the frankfurter chain 16 is fed from the previous processing station, which in the example is shown as steam unit 13, into the first carrier wheel 27, as best seen in FIG. 1. The path of the frankfurter chain 16 around the diameter of first carrier wheel 27 on one side of the first carrier wheel 27 will apply tension to the first outer side 109 of the frankfurter chain at the first stressing station 107. At this point the first slitter means 17 slits the casing 115. The frankfurter chain 16 being more flexible at the twists 137 thereof than the kernels 139, the ends of the kernels 139 will not allow a perfect radius around the diameter of the carrier wheel but will point outward moving the twists 137 much closer towards the knife 119. This will allow the casing 115 to be slit deeper towards the twists 137. This is illustrated by the shorter dimension shown by the arrows in FIG. 5 as compared with the longer dimension shown by the arrows in FIG. 4 of a casing moving through the typical apparatus of the straight line type.

The frankfurter chain 16 continues on around the diameter on the opposite side of the next or second carrier wheel 29 which applies tension to the side of the frankfurter chain 16 opposite from the side of the casing 115 which had tension applied at the first stressing station 107 and second slitter means 19 slits the casing again. The casing of frankfurter chain 16 now has two slits 180° apart.

The frictional teeth 49 of the carrier wheels 27, 29, 31 provide a positive driving force when perpendicular to the frankfurter chain 16. As the frankfurter chain 16 is passed from one carrier wheel to the next, because of the physical shape of the teeth 49 when moving into a position adjacent the next carrier wheel, the side of such a tooth is no longer perpendicular to the frankfurter chain but is at an angle relative thereto as best seen in the broken away portion of first carrier wheel 27 in FIG. 1. This provides a release of the frankfurter chain 16 to the next carrier wheel.

The carrier wheels 27, 29, 31 are designed for a three point contact, as previously described, for absolute control. Each encased frankfurter kernel 139 is held captive to each carrier wheel as it moves forward, until it reaches the above mentioned releasing point.

The contact with the frankfurter chain 16 of the upper and lower flanges 57, 45 of the carrier wheels 27, 29 as the frankfurter chain moves from carrier wheel 27 to carrier wheel 29 (after first slitter means 17 slits the casing 115) will tend to loosen casing 115 in one direction. Then as the frankfurter chain 16 is slit at the second stressing station 111 and transferred to carrier wheel 31, the loosening is applied in the opposite direction. This could possibly reduce the quantity of air and steam required to process the chain of frankfurters and the like.

It will be understood that the multiplicity of guide rollers 99 are provided along one side of first carrier wheel 27 in spaced relationship to the first carrier wheel and in position to engage the outer side of the frankfurter chain 16, as best seen in FIGS. 1 and 3. A multiplicity of guide rollers 99 are similarly placed on the opposite side of the second carrier wheel 29, and if desired one or more rollers 99 may be provided adjacent third carrier wheel 31 as best seen in FIG. 1. The rollers 99 aid in guiding the frankfurter chain 16 and are preferably formed of plastic or if desired stainless guide rails may be utilized.

From the foregoing it will be seen that the casing 115 of the frankfurter chain 16 is loosened prior to being removed at vacuum means 23. Thus, this loosening is accomplished by providing the winding or sinuous path around the diameters of the carrier wheels, which increases the stress or tension at the points where casing 115 is cut, and the flanges 57, 45 of the carrier wheels 27, 29 and 31 in contact with the sides of the frankfurter chain 16 actually loosen the casing as it is passed from one carrier wheel to the next carrier wheel. Three carrier wheels are shown in the drawings, but it will be understood that more may be provided for increasing the loosening of the casing.

Although the present invention has been described and illustrated with respect to a preferred embodiment and a preferred use thereof, it is not to be so limited since changes and modifications can be made therein which are within the full intended scope of the invention.

We claim:

1. Apparatus for skinning the casing from a chain of encased frankfurters and the like comprising:
    (a) conveying means for loosening the casing of the frankfurters and at the same time conveying the frankfurters endwise in a moving chain of frankfurters along a sinuous path and for applying tension to the chain of frankfurters to provide at least a pair of stressing stations at which the chain of frankfurters is bent and the casing thereof is stressed at least along one side; and
    (b) knife means provided at least at one of said stressing stations for slitting the stressed side of the casing of the chain of frankfurters as the chain moves by one of said stressing stations.

2. The apparatus of claim 1 in which said conveying means includes:
    (a) a first carrier wheel means for moving the chain of frankfurters in a first curved direction to provide the first one of the stressing stations at which the chain of frankfurters is bent in one direction and the casing thereof is stressed along a first side;
    (b) a second carrier wheel means for moving the chain of frankfurters in a second curved direction which is a reverse curved direction from said first curved direction to provide the second one of the stressing stations at which the chain of frankfurters is bent in the opposite direction from the bend of the first stressing station and the casing thereof is stressed along a second side remote from the first side;

and in which said apparatus of claim 1 further includes:
    (c) a first knife means at said first one of said stressing stations for slitting a first side of the casing of the chain of frankfurters; and
    (d) a second knife means at said second one of said stressing stations for slitting a second side of the casing of the chain of frankfurters.

3. The apparatus of claim 2 in which each of said first and second carrier wheel means includes adjustable means for gripping different sizes of frankfurters.

4. The apparatus of claim 2 in which each of said first and second carrier wheel means includes a rotatably driven axle, a lower carrier wheel half, an upper carrier wheel half, the lower carrier wheel half including a lower flange having an upper surface, the upper carrier wheel half including a upper flange having a lower surface; the upper surface of the lower carrier wheel half having teeth means for frictionally engaging the chain of frankfurters on the bottom thereof, the lower surface of the upper carrier wheel half having teeth means for frictionally engaging the chain of frankfurters on the top thereof, and the lower carrier wheel half including a cylindrical mid-portion means from which the lower flange thereof extends for engaging the chain of frankfurters on the side thereof so that with the frictional engagement by the teeth of the upper and lower carrier means and the engagement by the mid-portion of the lower carrier the chain of frankfurters are held securely; mounting means interacting between the axle and the lower carrier wheel half and the upper carrier wheel half for mounting the lower carrier wheel half and the upper carrier wheel half on the axle, for causing movement of the upper and lower carrier wheel halves selectively towards and away from one another in response to turning movement of the upper carrier wheel half while maintaining a fixed centerline between the upper surface of the lower flange of the lower carrier wheel half and the lower surface of the upper flange of the upper carrier wheel half and for causing the lower carrier wheel half to turn together with the upper carrier wheel half in response to turning of the upper wheel half so that frankfurters of different diameters may be accommodated.

5. The apparatus of claim 4 which includes guide means on opposite sides of the chain of frankfurters from the stressing stations for assisting in guiding the chain of frankfurters in said sinuous path.

6. In an apparatus for skinning the casing from a chain of encased frankfurters and the like comprising, in combination:
   (a) steam means for heating the chain of frankfurters;
   (b) vacuum means remote from said steam means for providing a vacuum adjacent the chain of frankfurters;
   (c) a first carrier wheel means downsteam of said steam means and upstream of said vacuum means for moving the chain of frankfurters in a first curved direction to provide a first stressing station at which the chain of frankfurters is bent in one direction and the casing thereof is stressed along a first side;
   (d) a second carrier wheel means downstream of said first carrier means and upstream of said vacuum means for moving the chain of frankfurters in a second curved direction which is a reverse curved direction from said first curved direction to provide a second stressing station at which the chain of frankfurters is bent in the opposite direction from the bend of the first stressing station and the casing thereof is stressed along a second side remote from the first side; and
   (e) a third carrier wheel means downstream of said second carrier means and upstream of said vacuum means for moving the chain of frankfurters from said second carrier wheel means to said vacuum means for removal of the casing from the chain of frankfurters.

7. The apparatus of claim 6 which includes:
   (a) a first knife means at the first stressing station for slitting the first side of the casing of the chain of frankfurters; and
   (b) a second knife means at said second stressing station for slitting said second side of the casing of the chain of frankfurters.

8. The apparatus of claim 6 which includes guide means on opposite sides of the chain of frankfurters from the stressing stations for assisting in guiding the chain of frankfurters.

9. The apparatus of claim 6 which includes:
   (a) first finger means adjacent the first carrier wheel means for engaging the chain of frankfurters downstream of the first stressing station for ensuring release of the chain of frankfurters from the first carrier wheel means so that the chain of frankfurters can continue to the second carrier wheel means, and
   (b) second finger means adjacent the second carrier wheel means for engaging the chain of frankfurters downstream of the second stressing station for ensuring release of the chain of frankfurters from the second carrier wheel means so that the chain of frankfurters can continue to the third carrier wheel means.

10. The apparatus of claim 6 which includes air means adjacent the third wheel means for assisting in removal of the casing from the chain of frankfurters.

11. A method for skinning the casing from a chain of encased frankfurters and the like comprising the steps of:
   (a) moving the chain of encased frankfurters endwise along a sinuous path and past a first stressing station and subsequently past a second stressing station;
   (b) at the first stressing station, as the chain of encased frankfurters moves through the first stressing station, bending said chain of encased frankfurters to provide a first stressed side of the casing of the chain of encased frankfurters;
   (c) at the first stressing station slitting the first stressed side of the casing of the chain of encased frankfurters;
   (d) at the second stressing station, as the chain of encased frankfurters moves through the second stressing station, bending the chain of encased frankfurters to provide a second stressed side of the casing of the chain of encased frankfurters remote from said first stressed side;
   (e) at the second stressing station slitting the second stressed side of the casing of the chain of encased frankfurters; and
   (f) removing the slit casing from the chain of frankfurters.

12. The method of claim 11 in which the second stressing station is on the opposite side of the chain of encased frankfurters from the first stressing station.

13. The method of claim 12 in which the slitting of the second side of the casing of the chain of frankfurters is substantially 180 degrees from the slitting of the first side of the casing of the chain of frankfurters to provide slits in the first and second sides of the chain of frankfurters substantially 180 degrees apart extending longitudinally of the casing of the frankfurters.

* * * * *